Figure 1:
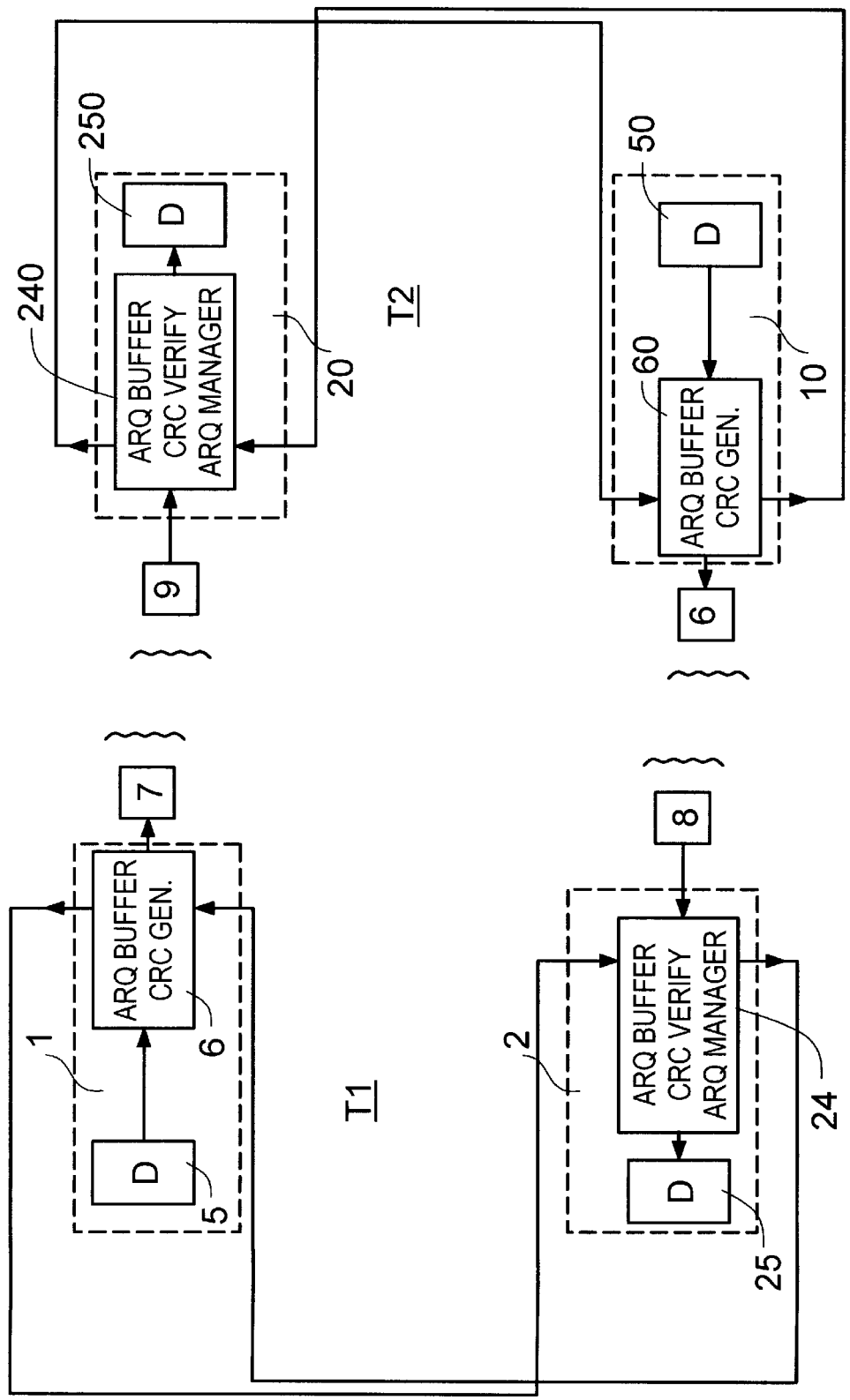

United States Patent [19]
Langmann

[11] Patent Number: 6,163,869
[45] Date of Patent: Dec. 19, 2000

[54] METHOD OF RE-SENDING INCORRECTLY TRANSMITTED DATA

[75] Inventor: Peter Langmann, Ruprechtshofen, Austria

[73] Assignee: Ericsson Austria Aktiengesellschaft, Vienna, Austria

[21] Appl. No.: 08/981,798

[22] PCT Filed: Jun. 21, 1996

[86] PCT No.: PCT/AT96/00111

§ 371 Date: Apr. 17, 1998

§ 102(e) Date: Apr. 17, 1998

[87] PCT Pub. No.: WO97/01898

PCT Pub. Date: Jan. 16, 1997

[30] Foreign Application Priority Data

Jun. 26, 1995 [AT] Austria ................................. 1088/95

[51] Int. Cl.$^7$ .................................................. H04L 1/18
[52] U.S. Cl. ........................ 714/748; 714/798; 714/799
[58] Field of Search .................................... 714/748, 798, 714/799

[56] References Cited

U.S. PATENT DOCUMENTS

| | | | |
|---|---|---|---|
| 3,878,333 | 4/1975 | Shimizu et al. ........................... | 178/23 |
| 4,110,558 | 8/1978 | Kageyama et al. ..................... | 178/69.1 |
| 5,719,883 | 2/1998 | Ayanoglu ................................ | 714/751 |

OTHER PUBLICATIONS

IEEE Transaction on Communications, "An Improved Selective–Repeat ARQ Strategy", E.J. Weldon Jr., vol. Com–30, No. 3, Mar. 1982, pp. 480–486.

M. Nakamura et al., "Performance Evaluation for ARQ Schemes in Power and/or Bandwidth Limited Systems", The Transactions of the IEICE, vol. E72, No. 5, May 1989, pp. 494–501.

"A New Selective Retransmitted ARQ System", IEEE Global Telecommunications Conference Record, vol. 3, Nov. 29, 1993, pp. 1815–1821.

R. Fantacci, "Performance Evaluation of Efficient Continous ARQ Protocols", IEEE Transactions on Communications, vol. 38, No. 6, Jun. 1990, pp. 773–781.

H. Bruneel et al., "On the Throughput Performance of Some Continuous ARQ Strategies with Repeated Transmissions", IEEE Transactions on Communications, vol. Com–34, No. 3, Mar. 1986, pp. 244–249.

*Primary Examiner*—Trinh L. Tu
*Assistant Examiner*—Esaw Abraham
*Attorney, Agent, or Firm*—Burns, Doane, Swecker & Mathis, L.L.P.

[57] ABSTRACT

A method for repeating data transmitted incorrectly (ARQ) between subscribers having in each case at least one transmit section, and at least one receive section. A data stream at the transmitting subscriber's end is subdivided into data words having a predetermined length. The data stream is combined to form data words where the individual data words are temporarily stored in a transmit buffer. The individual data words are transmitted, if necessary via a transmit unit, and are received by the receiving subscriber, if necessary in a receive unit. After temporary storage in a receive buffer the received data word is output. If an error has occurred during the transmission the error is detected and a command for retransmission of the data word transmitted incorrectly is issued via the transmit section of the receiving subscriber and received by the receive section of the transmitting subscriber, which then directs the transmit section of the transmitting subscriber to perform ARQ retransmissions of the data transmitted incorrectly. The ARQ retransmissions are carried out via a predetermined proportion, which is constant in the time average, of the number of the data words transmitted within the averaged period of time, characterized in that, if the proportion provided for the retransmission is exceeded by incorrect data words, the incorrect data words are output from the receive buffer in a form not corresponding to their original information.

4 Claims, 1 Drawing Sheet

METHOD OF RE-SENDING INCORRECTLY TRANSMITTED DATA

The invention relates to a method for retransmitting data transmitted incorrectly (ARQ), in which method, for the purpose of transmission between subscribers having in each case at least one transmit section and at least one receive section, a data stream at the transmitting subscriber's end is subdivided into data words having a predeterminable length and is combined to form data words and the individual data words are temporarily stored in a transmit buffer, are transmitted, if necessary via a transmit unit, and are received by the receiving subscriber, if necessary in a receive unit and, after temporary storage in a receive buffer are output, in which arrangement an error which has occurred during the transmission is detected and a command for retransmission of the data word transmitted incorrectly is issued via the transmit section of the receiving subscriber and the receive section of the transmitting subscriber to the transmit section of the transmitting subscriber.

Such known ARQ methods are used for securing error-free data transmission in various applications. For this purpose, the transmitted data word, after having been received, is checked by means of a fixed routine in an error detection unit. If an incorrect data word occurs, the transmitting subscriber is requested to repeat this data word until the correctness of the transmission is confirmed at the receiving subscriber's end.

In this arrangement, however, the disturbance causing the incorrect transmission may occur relatively frequently over a prolonged period of time as a result of which the incorrect data words are requested again and again by the receiving subscriber during which time no further data can be transmitted. For this reason, the transmitted-information rate may decrease steeply.

On the basis of the methods mentioned initially, the invention has the object of improving such a method with the aim of being able to keep the data throughput constant between transmitting and receiving subscriber.

According to the invention, this is achieved by the ARQ retransmissions of the data transmitted incorrectly being carried out via a predeterminable proportion, which is constant in the time average, of the number of data words transmitted within the averaged period of time.

As a result, an excess transmission capacity is continuously available during the data transmission. If a data word is received incorrectly, the receiver only requests a retransmission for as long as this is possible in connection with the excess capacity available in the time average so that the nominal data throughput can be kept constant without being influenced by the retransmissions. The ARQ retransmissions of the data transmitted incorrectly are thus carried out via a constant predeterminable proportion of the number of data words transmitted within a predeterminable period of time in each case. The duration of the period of time over which the averaging over time is carried out is essentially limited by the storage capacity of the transmit or receive ARQ buffer used. In the case of incorrect transmission, a signal with higher redundancy is transmitted.

In this connection, the method according to the invention is basically suitable for all types of data transmission but especially for data streams which need a constant bit rate in order to maintain timing relationships between various units which applies, for example, to coded and possibly compressed data as are necessary for video and/or audio transmission.

To obtain a high-quality transmission, it is advantageous to select the proportion of the retransmissions carried out in the time average to be between 2 and 7%.

In this connection, it has been found to be especially advantageous if this proportion is specified to be approximately 3.3% since it is possible in this case to achieve a very high constant transmission rate with good transmission quality.

According to another variant of the invention, it can be provided for the data words to be transmitted from the transmit buffer faster than they are written into the latter, the resultant gap in the transmission being filled by retransmission of one or more data words and, if necessary, if the proportion provided for the retransmission is exceeded by incorrect data words, the incorrect data words being output from the receive buffer in a form not corresponding to their original information, for example with a predeterminable value.

As a result, a fixed proportion of excess capacity, which can be utilized for retransmissions in case of need, is provided during the transmission. Although the data words which are superfluous in the error-free case or, respectively, the excess capacity will slightly impair the immunity of the transmitted data to errors, there cannot be a congestion of data words which are retransmitted time and time again, causing a steep drop in the transmission rate.

In the text which follows, the invention will be explained in greater detail with reference to an illustrative embodiment shown in the drawing, in which:

FIG. 1 shows a block diagram for carrying out one embodiment of the method according to the invention.

In a bidirectional data transmission of digital data between two subscribers T1, T2 according to the block diagram shown in FIG. 1, one transmit section, 1, 10 and one receive section 2, 20 each are provided for each subscriber T1, T2. The subscriber T1, which in this case is transmitting, by way of example, subdivides the digital data present from a data source 5 into data words of predeterminable length so that in each case it is always one whole such word which is processed further. The expression data word is quite generally to be understood as a collection of digital data and is in no way restricted with respect to the number or type of data contained therein. A data word can contain, for example, only one bit but also several bits of digital information. In addition, any possible type of data can be used for this transmission method. After the subdivision into data words, a temporary storage is effected in an ARQ transmit buffer 6 before they are converted into a transmit signal in a transmit unit 7 and are transmitted to the receiving subscriber T2 where they are reconverted in a receive unit 9. The transmit unit and receiving unit which carry out the conversion of a transmit or receive signal, usually generated by modulation, for example, can be omitted if the data are transmitted directly.

An error which has occurred during the transmission is detected by an error detection unit (CRC) in an ARQ receive buffer 240 and via the ARQ control a command is issued to the transmit section 10 of the receiving subscriber T2, which command is transmitted via the transmit unit 6 to the receive section 2 of the transmitting subscriber T1 where it is detected and then this command is delivered to the ARQ transmit buffer 6 for retransmission of the transmitted incorrectly data word to the transmit section 1 of the transmitting subscriber T1.

According to the invention, the ARQ retransmissions of the data transmitted incorrectly are carried out via a predeterminable proportion, which is constant in the time average, of the number of data words transmitted in the averaged period of time. The ARQ retransmissions of the data transmitted incorrectly are thus carried out via a constant predeterminable proportion of the number of data words transmitted in each case in a predeterminable period of time. The successive predeterminable period of times are essentially limited by the storage capacity of the transmit buffer and receive buffer, respectively. In the case of data transmissions, therefore, a certain proportion in each defined period of time is kept free for the retransmission of incorrect data words and, if necessary, a corresponding number of data words are retransmitted within this proportion of time. The retransmission can be done at any time within this predetermined period of time.

The method according to the invention is fundamentally suitable for all types of data transmission, but especially for data streams which need a constant bit rate in order to maintain timing relationships between various units which applies, for example, to coded and possibly compressed data such as are necessary for video and/or audio transmission.

For this purpose, the data words are continuously written into the ARQ transmit buffer 6 and forwarded by the latter to the transmit unit 7 during the transmission of the data. The data leaving the buffer 6 are transmitted faster than they are entered into the buffer. The resultant gap in the transmission is filled by retransmission of one or more data words which, however, are detected as retransmitted block at the receiver end and are automatically eliminated. In the case of an error-free transmission, transmission is thus continuously effected with excess capacity without the transmitted information content being any larger. If the proportion provided for the retransmission is exceeded by incorrect data words so that more incorrect data words arrive at the receive section 20 than can be retransmitted, the excess of incorrect data words is output transparently, i.e. in a form which does not correspond to their original information, for example with a predeterminable value, from the receive buffer 240.

If a transmit error occurs, the receiving subscriber T2 detects the error by means of its CRC error detection in the ARQ unit 240 and thereupon issues the command for data retransmission to the transmit section 10 of the subscriber 2 [sic]. At the subscriber's end T1, this information, after passing through the receive unit 8, is issued as control command for repeating the incorrect transmission to the ARQ buffer 6.

According to the invention, only a fixed predeterminable proportion is available in the time average for retransmitting the incorrect data words, a proportion of 2 to 7% having been found to be especially advantageous in many applications. A proportion of approximately 3.3% has been found to be especially successful since it was possible to achieve a very high constant data transmission rate in this case, in spite of incorrect transmissions, the transmitted information content having been much higher than that which can be achieved by means of a conventional ARQ method.

The proportion and the number of data words for retransmission according to the invention are not subject to any restriction in this connection and can be arbitrarily adapted to the prevailing conditions within the framework of what can be technically achieved.

As a practical example of an application, a time-division multiplex method can be quoted in which the transmission time frame has a number of time slots, one time slot of which, for example, can be provided in the time average for retransmissions.

After an incorrect transmission, the retransmission, which can also extend over a number of successive time slots, is then carried out in one of the successive time frames. Averaged over time, only one time slot per frame, for example, can be used for the retransmissions.

The period of time over which the time average is calculated in this arrangement is essentially determined by the capacity of the ARQ buffer 6. As soon as this buffer has been filled with information, no further retransmissions can be carried out and the incorrect data block must be output as a transparent block at the receiver end.

Compared with a conventional ARQ method, the period of time specified for the data retransmissions according to the invention is fixed in the time average. As a result, it cannot happen that, due to a prolonged disturbance, the transmission is repeated until it is error-free and thus the transmission time is greatly increased. In the known ARQ method, the data transmission is repeated, even in the case of arbitrary disturbances, until it is received correctly, as a result of which, however, the data throughput drops greatly. In contrast, the transmission in the method according to the invention is only repeated for as long as it is possible within the framework of the excess capacity in order to maintain the nominal data throughput, due to the fixed excess capacity which is between 2 and 7% but preferably about 3.3%. If, when there are a number of successive wrong data blocks, one can no longer be repeated and correctly received, it is output transparently.

What is claimed is:

1. Method for repeating data transmitted incorrectly (ARQ), in which method for the purpose of transmission between subscribers (T1, T2) having in each case at least one transmit section, and at least one receive section, a data stream at the transmitting subscriber's end is subdivided into data words having a predetermined length and is combined to form data words and the individual data words are temporarily stored in a transmit buffer, are transmitted, if necessary via a transmit unit, and are received by the receiving subscriber, if necessary in a receive unit and, after temporary storage in a receive buffer are output, in which arrangement an error which has occurred during the transmission is detected and a command for retransmission of the data word transmitted incorrectly is issued via the transmit section of the receiving subscriber and the receive section of the transmitting subscriber to the transmit section of the transmitting subscriber, the ARQ retransmissions of the data transmitted incorrectly being carried out via a predetermined proportion, which is constant in the time average, of the number of data words transmitted within the averaged period of time, characterized in that, if the proportion provided for the retransmission is exceeded by incorrect data words, the incorrect data words are output from the receive buffer in a form not corresponding to their original information.

2. Method according to claim 1, characterized in that the proportion of the retransmissions carried out in the time average is selected to be between 2 and 7%.

3. Method according to claim 1, characterized in that the proportion of the retransmissions carried out in the time average is selected to be approximately 3.3%.

4. Method according to claim 1, characterized in that the data words are transmitted from the transmit buffer faster than they are written into the latter, the resultant gap in the transmission being filled by retransmission of one or more data words.

\* \* \* \* \*